United States Patent [19]
Linn et al.

[11] Patent Number: 5,294,276
[45] Date of Patent: Mar. 15, 1994

[54] METHOD OF MAKING PAINT ROLLER

[75] Inventors: Richard A. Linn, Minneapolis; Wade H. Krinke, St. Croix, both of Minn.

[73] Assignee: Padco, Inc., Minneapolis, Minn.

[21] Appl. No.: 68,934

[22] Filed: May 28, 1993

Related U.S. Application Data

[63] Continuation-in-part of Ser. No. 943,414, Sep. 11, 1992, abandoned.

[51] Int. Cl.$^5$ .................................................. B05C 1/08
[52] U.S. Cl. .................................. 156/154; 156/191; 156/195; 156/226; 156/227
[58] Field of Search .................. 15/230.11; 156/153, 156/154, 187, 191, 193, 195, 198, 211, 216, 226, 227, 294; 492/17, 19, 29, 48

[56] References Cited

U.S. PATENT DOCUMENTS 3,030,696  4/1962  Serwer ................................ 156/187
3,226,799  1/1966  Grodberg et al. ..................... 492/29

Primary Examiner—Michael W. Ball
Assistant Examiner—Richard Crispino
Attorney, Agent, or Firm—Jacobson & Johnson

[57] ABSTRACT

A process of making a paint roller with a foldable end comprising the steps of: securing a paint-roller support core to a paint-roller pad and then removing a portion of the core secured to the paint-roller pad. If multiple paint rollers are being made, one cuts the paint-roller pad and support core into multiple segments with the cut ends of the segmented paint-roller pad and core coextensive with each other. Next, one removes a portion of the ends of the support core without removing the paint-roller pad extending over the support core to leave a paint roller with an unsupported free pad end that is folded over the end of the core of the paint roller to provide full corner painting abilities. The paint roller with a covered end can be rotatably mounted on different types of paint-roller frames.

17 Claims, 6 Drawing Sheets

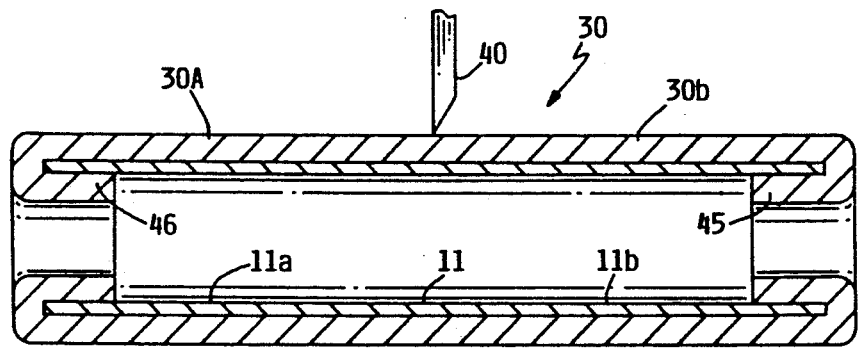
FIG. 8
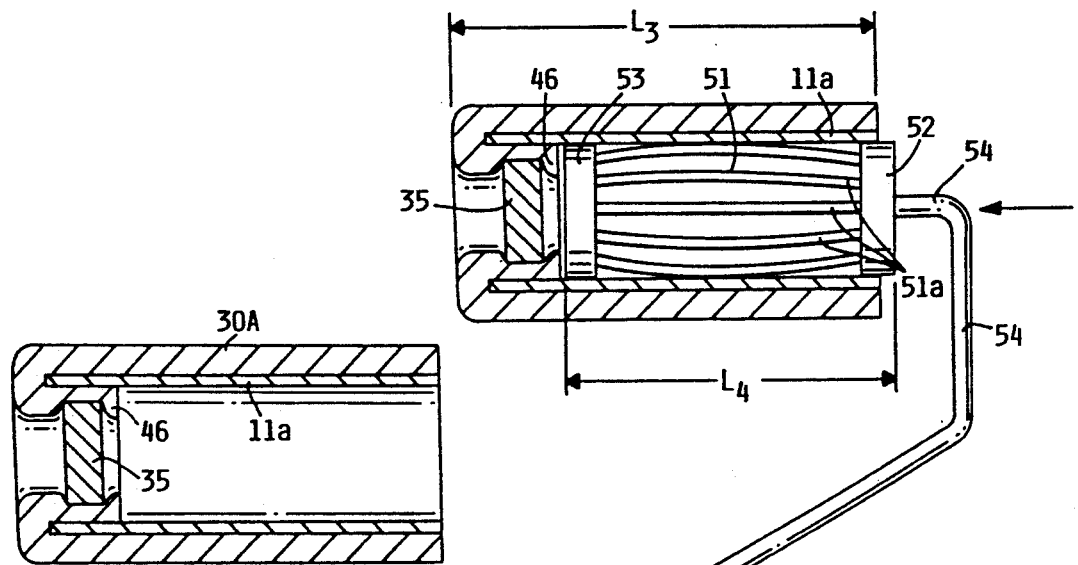
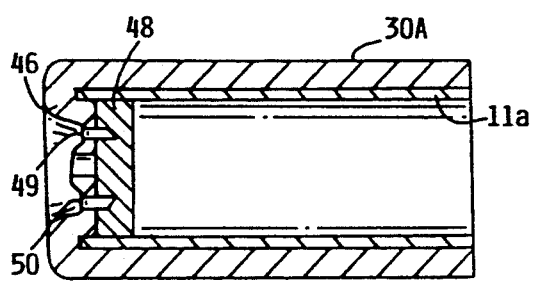
FIG. 9
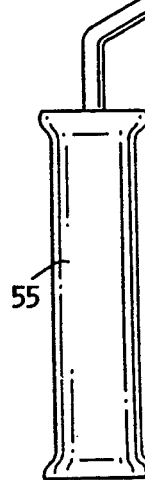
FIG. 11
FIG. 10

METHOD OF MAKING PAINT ROLLER

CROSS REFERENCE TO RELATED INVENTIONS

This invention is a continuation in part of our U.S. patent application Ser. No. 07/943,414 filed Sep. 11, 1992, now abandoned titled "Method of Making Paint Roller."

FIELD OF THE INVENTION

This invention relates generally to paint rollers and, more specifically, to a method of making a paint roller with an end that can be folded over the end of a support roller or tucked into the end of the support roller to provide an end surface to the paint roller to permit a user to paint adjacent corner surfaces with one sweep of the paint roller.

BACKGROUND OF THE INVENTION

Paint rollers are generally well known in the art and comprise a support core with a cylindrical fabric sleeve on the exterior of the support core. A paint roller fabric sleeve extending around the end of the paint roller simplifies rolling paint into corners because it enables the paint roller to simultaneously apply paint to adjacent surfaces of the corner.

One process of making such a corner paint roller involves making an elongated fabric sleeve longer than the rigid support core, and then sliding the sleeve over the core to enable a painter to tuck the ends of the sleeve into the core.

The present process involves an improved process of either individual or mass production of paint rollers with a foldable end or foldable ends by spirally wrapping and adhesively fastening a paint-roller fabric cover around an elongated master support core and then cutting the spirally-wound master paint roller into cylindrical segments. In a variation of the process, one spirally wraps and adhesively fastens or heat bonds a paint-roller fabric cover around an individual support core. The next step of the process entails removing a portion from one or both ends of the support core of the segments; this step results in an unsupported outer end of the paint-roller cover which is then either folded over the edge of the paint-roller support core or tucked into the end of the remaining portion of the support core.

DESCRIPTION OF THE PRIOR ART

U.S. Pat. No. 2,298,682 shows a felt covering pulled over a trundle and a second plush-like tissue cover over the felt. The covers join on both sides to form a so-called "stocking." The outer cover is longer than the trundle, so the ends of the cover overlap the ends of the trundle.

U.S. Pat. No. 2,645,845 shows a fabric cover fitted over a cylindrical mounting member with washers for holding the tucked-in ends in the support tube.

U.S. Pat. No. 2,684,497 shows a paint roller with a sleeve fitted with a fabric cover. The fabric cover overlaps the ends of the sleeve, and end members or cups hold it in place.

U.S. Pat. No. 2,972,158 shows a paint applicator with an absorbent ring secured to the end of the paint-roller cover to provide the end of the paint roller with a paint-absorbent surface.

U.S. Pat. No. 4,237,592 shows an elastic roller with a fabric sleeve extending over a rigid shaft member held on the end portions thereof.

U.S. Pat. No. 4,937,909 shows a paint roller with tucked ends, having members for forming a liquid-tight locking arrangement to prevent paint from contacting the padding and adhesive on the inside of the core.

French patent 1,043,989 shows a paint roller with the ends of the paint-roller cover tucked into the paint roller.

French patent 2,225,138 similarly shows a paint-roller cover tucked into the paint roller support.

Australia patent 214,506 uses cup-shaped end caps to hold the tucked-in ends of the paint roller in place.

Swiss patent 303,751 similarly shows a paint-roller cover with ends tucked into the support roller.

German patent 3,527,646 similarly shows a paint-roller cover with the paint cover tucked in and held on the ends of the paint roller.

BRIEF DESCRIPTION OF THE DRAWINGS

FIG. 7 shows the paint roller of FIG. 6 with the ends tucked in.

FIG. 8 shows the roller of FIG. 7 with tucked-in ends being severed to form two rollers, each having a single tucked end;

FIG. 9 shows the severed roller of FIG. 8 with a cylindrical plug holding the tucked end in place;

FIG. 10 shows a squirrel-cage rotor inserted into the interior of the paint-roller support core of FIG. 9;

FIG. 11 shows a paint roller with a tucked end stapled to the end of a cylindrical plug;

BRIEF SUMMARY OF THE INVENTION

Briefly, the invention comprises a method of individually or mass producing paint rollers with foldable ends. To mass produce paint rollers, one forms a master spirally wound paint roller which is then cut into suitable paint roller lengths. Next, the annular ends of the rigid support core are machined away, leaving annular, flexible, fabric ends which one can either fold over the edge of the support core or tuck into the support core to produce a paint roller that can simultaneously apply paint to adjacent surfaces of a corner.

DESCRIPTION OF THE PREFERRED EMBODIMENT

Figure 1:
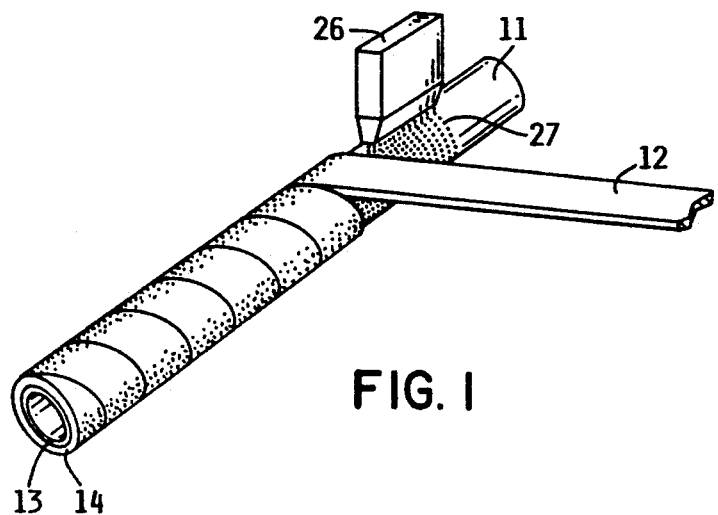
FIG. 1 shows a master paint-roller support core being spirally wound with a fabric cover.

FIG. 1 shows a flexible fabric or paint-holding material 12 being spirally wound on a master paint-roller support core 11. Master paint roller support core 11 comprises a rigid, self-supporting cylindrical core which, when cut to length, can be frictionally mounted on a bearing of a paint-roller applicator. Master paint-roller support core 11 is made of a machineable, but rigid, material, such as a phenolic resin. In one embodiment of the process of forming the master paint roller, the master paint-roller support core is made in lengths that can be cut to produce multiple paint rollers. Typically, an adhesive 27 is applied to the surface of the master paint-roller core 11 through an applicator 26. After adhesive is applied, a fabric covering 12 is spirally wound around the master paint-roller support core 11 at an angle of about 45 degrees with respect to a central axis 20 (FIG. 3) until the core is completely covered. In another method, the fabric is heat bonded to the support core in a process more fully described in U.S. Pat. No. 4,692,975.

Figure 2:
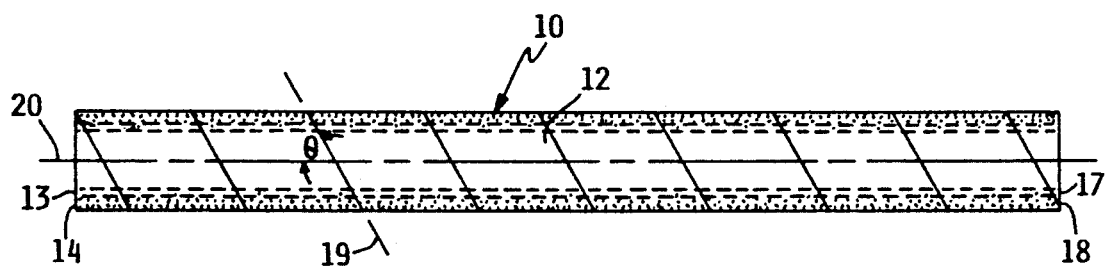
FIG. 2 shows a master one-piece, spirally-wound uncut paint roller.

FIG. 2 shows paint roller 10 with cover 12 spirally wound and adhesively fastened around the entire length of the master paint-roller support core 11. A central axis 20 extends through paint roller 10 with end 13 of core 11 and end 14 of fabric 12 coextensive with each other. Similarly, on the opposite end, core end 17 is coextensive with the end of cover 18. FIG. 2 shows a plane 19 extending along the edge of spiral-wrapped fabric 12. Typically, plane 19 makes an angle of approximately 45 degrees with the central axis 20. The purpose of using a spiral-wound fabric is to allow a user to continually wrap a support core with a narrow strip of fabric and still not leave a continuous fabric abutting the section perpendicular to the axis 20 which may result in streaking when a painter rolls paint on a surface.

Figure 3:
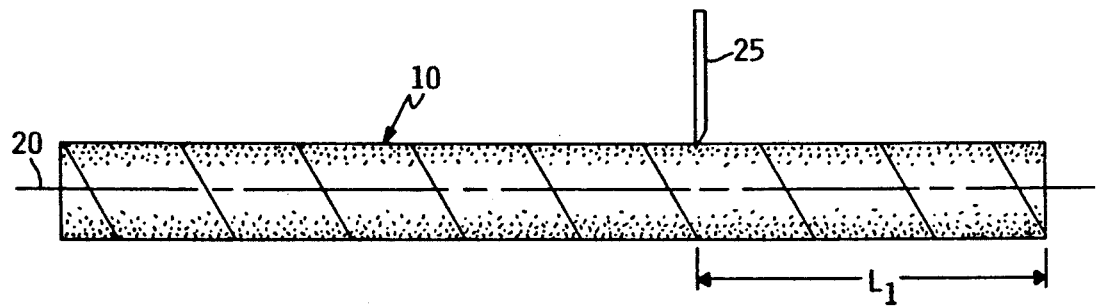
FIG. 3 represents the process of cutting the master one-piece paint roller of FIG. 2 to length.
Figure 3A:
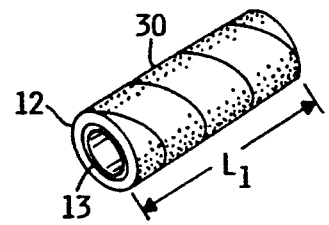
FIG. 3A shows a paint roller cut by the process of FIG. 3.

FIGS. 3 and 3A show the next step in the process. A saw or a knife 25 located at a right angle to the axis 20 cuts cylindrical segments 30 off the master paint roller 10 to produce a paint-roller segment 30 having pad end 12 and fabric end 13 coextensive with each other. If desired, an individual support roller could be made with the ends removed for folding the free end of the cover onto the end of the support roller. Similarly, the fabric end and the pad end on the opposite ends of the paint-roller segment are coextensive with each other. In this condition, the ends of the cut segments are basically unfoldable since the ends of the rigid support core 11 and the ends of the fabric 12 are coextensive with one another.

Figure 4:
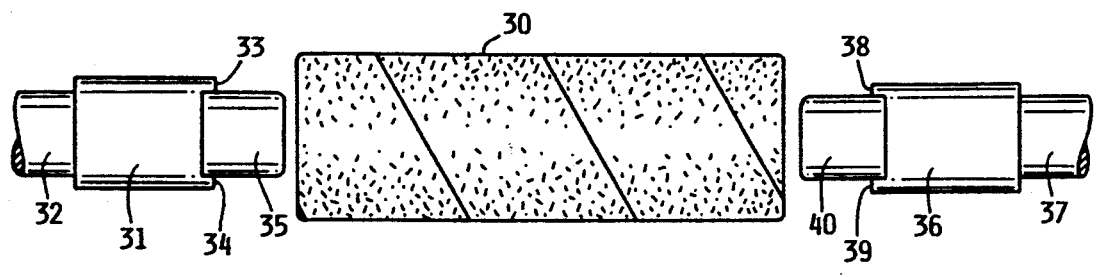
FIG. 4 shows a cut segment of the master one-piece paint roller.

FIG. 4 shows the paint-roller segment 30 held in place by means not shown, while a first shaft 32 directs a first end mill 31 having cutting teeth 33 and 34 and a core guide 35 into one end of paint-roller segment 30, while a second shaft 37 directs a second end mill 36 having cutting teeth 38 and 39 and a core guide 40 into the opposite end paint-roller segment 30.

Figure 5:
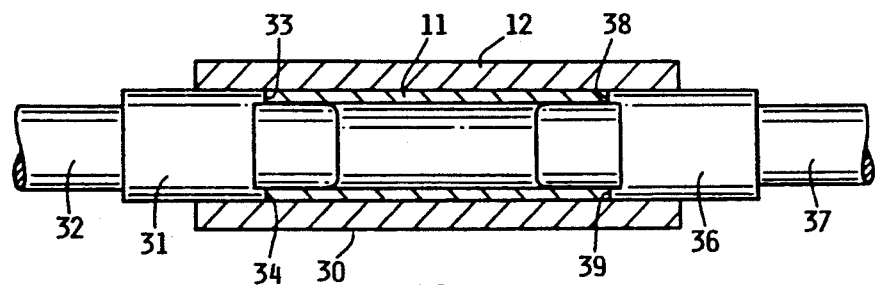
FIG. 5 shows cut segment of the master one-piece paint roller having the ends machined to remove the ends of the support core.

FIG. 5, a cross-sectional view of paint-roller segment 30, shows cutting teeth 33 and 34 removing one end of paint-roller segment 30 and cutting teeth 38 and 39 removing the opposite end of paint-roller segment 30 while leaving the outer fabric covering 12 intact. With certain fabric pads, one may want to rotate the tools while holding the core and pad stationary. In other applications, particularly where the fabric is soft and flexible, one may want to rotate the fabric core and hold the tools stationary. When the core is rotated, the centrifugal forces force the paint fabric radially away from the cutting teeth, this minimizing any snagging or tearing of the fabric as the support core is removed from beneath the fabric pad.

Figure 6:
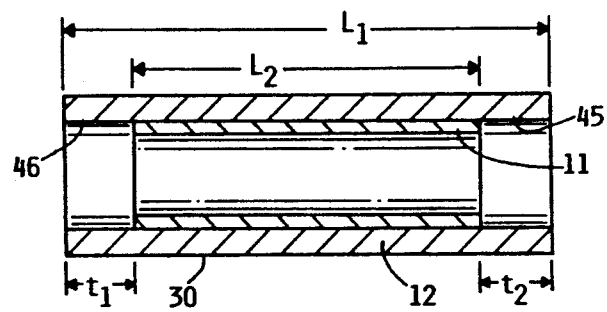
FIG. 6 shows a paint roller with unsupported ends.

FIG. 6 shows paint roller 30 with the ends of the support core 11 removed, so that annular free end 45 and annular free end 46 of fabric 12 are unsupported and, therefore, foldable. $L_2$ designates the length of the cover. $L_1$ designates the length of the support core, with $L_2$ being sufficiently longer than $L_1$ so that a user can fold the ends of the fabric over the edge of the support roller. If the ends of the fabric cover are longer, the user can, if desired, tuck the ends of the fabric into the end of the paint-roller support core.

Figure 7:
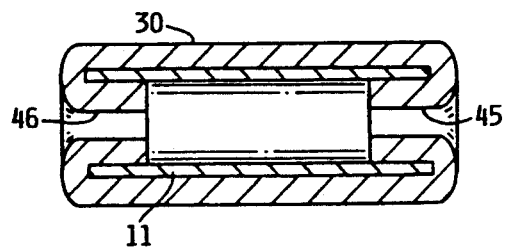

FIG. 7 shows the paint-roller segment with free end 45 tucked inward and around one end of the paint-roller segment 30, and the opposite free end 46 tucked inward and around the opposite end of the paint-roller segment 30, to thereby produce a paint roller wherein the free, unsupported ends are foldable around the inner ends of the support core to produce a paint roller capable of applying paint to corner regions.

FIGS. 1 to 7 illustrate the forming of tuckable ends on both ends of the paint roller. However, in most applications, only one end need be tucked in since only one end of the paint roller is used to paint corners. FIGS. 8–10 further illustrate alternate steps in making and assembling a paint roller with a tuckable end.

FIG. 8 shows paint roller segment 30 with two tuckable ends 45 and 46. Since only one tuckable end is needed on most rollers, a knife 40 cuts through paint roller 30 to form a paint roller 30a and a paint roller 30b. FIG. 9 shows paint roller 30a with one end of the fabric co-extensive with the end of support core 11 and the other end of fabric 46 tucked into core 11a. The tucked-in end is frictionally held in place by a solid, cylindrical plug 35.

FIG. 10 illustrates the paint roller of FIG. 9 being slid onto a conventional squirrel cage 51 which is rotatably mounted on shaft 54 which connects to handle 55. Normally, ends 52 and 53 of the squirrel cage project outward beyond the end of the paint roller to prevent paint from entering the interior of the paint roller. However, in the present process, one makes the length of the paint roller $L_3$ sufficiently longer than the length of the squirrel cage $L_4$. Consequently, only end 52 of squirrel cage 51 projects outward to seal the end of the paint roller. Since the inside diameter of support core 11a is slightly smaller than the outside diameter of squirrel cage 51, elongated members 51a frictionally engage the interior of the support core 11a. Thus, in the process of FIGS. 8 through 10, one makes a paint roller with one tucked end and another end with the fabric core extensive with the end of the support core. In this embodiment, the conventional squirrel cage support core can be inserted into the roller to support the paint roller.

FIG. 11 shows an alternate method of securing the tucked end 46 where a cylindrical plug 48 is secured to the inside of support core 11a. The free end 46 of the fabric is tucked inward and fasteners such as staples 49 and 50 extend through fabric end 46 and into plug 48 to hold the tucked end in place. Typically, plug 48 can be made from a material such as wood or plastic.

Figure 12:
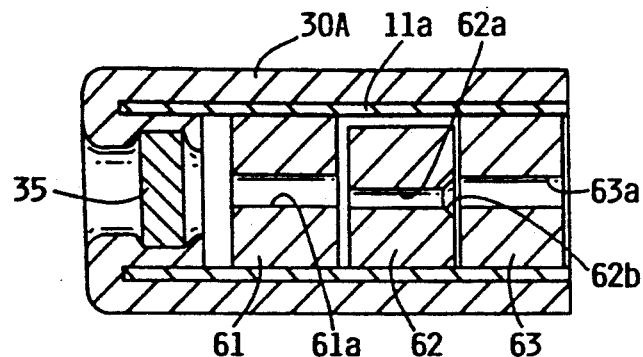
FIG. 12 shows a paint roller with a housing for receiving and rotatably securing to a cylindrical shaft.
Figure 13:
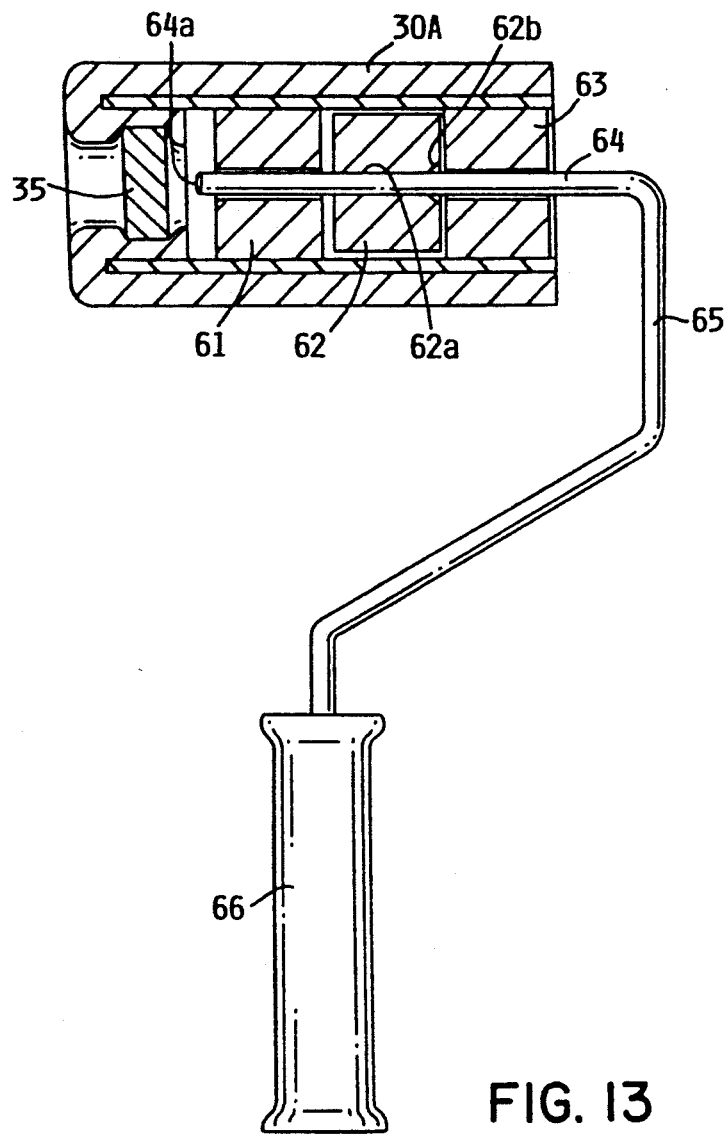
FIG. 13 shows a cylindrical shaft inserted into the housing of the paint roller of FIG. 12.

FIGS. 12 and 13 show an alternate method of forming a corner roller for mounting on a cylindrical axis. Paint roller 30a is shown having a first cylindrical bearing collar 61 secured to the inside of one end by paint-roller support core 11a and a second cylindrical bearing collar secured to the opposite end of paint-roller support core 11a. A resilient retaining collar member 62 having an interior opening 62a which is smaller than the diameter of shaft 64 is shown positioned between cylindrical bearing collars 61 and 63. To assemble paint roller 30a to support shaft 64, one pushes support shaft 64 inward (FIG. 13) causing end of shaft 64a to move freely through opening 63a, but expanding and frictionally engaging surface 62a of member 62. A frustro-conical end 62b in member 62 facilitates directing end of shaft 64 into the opening in member 62 Shaft 64 is inserted until end 64a extends through cylindrical support bearing 61. By inserting shaft 64 into the bearing in paint roller, one can form a paint-roller cover with a tucked end for use with the conventional friction-grasping cylindrical shaft 64 having a frame 65 and handle 66.

Figure 14:
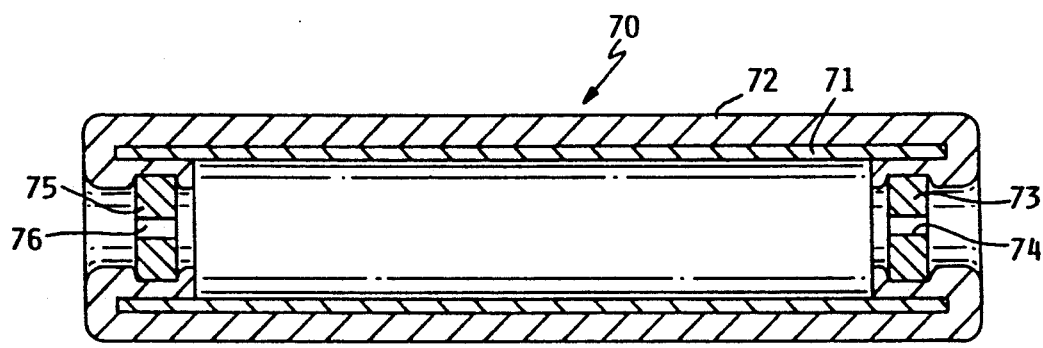
FIG. 14 shows a roller with the tucked ends having end plugs with central openings.
Figure 15:
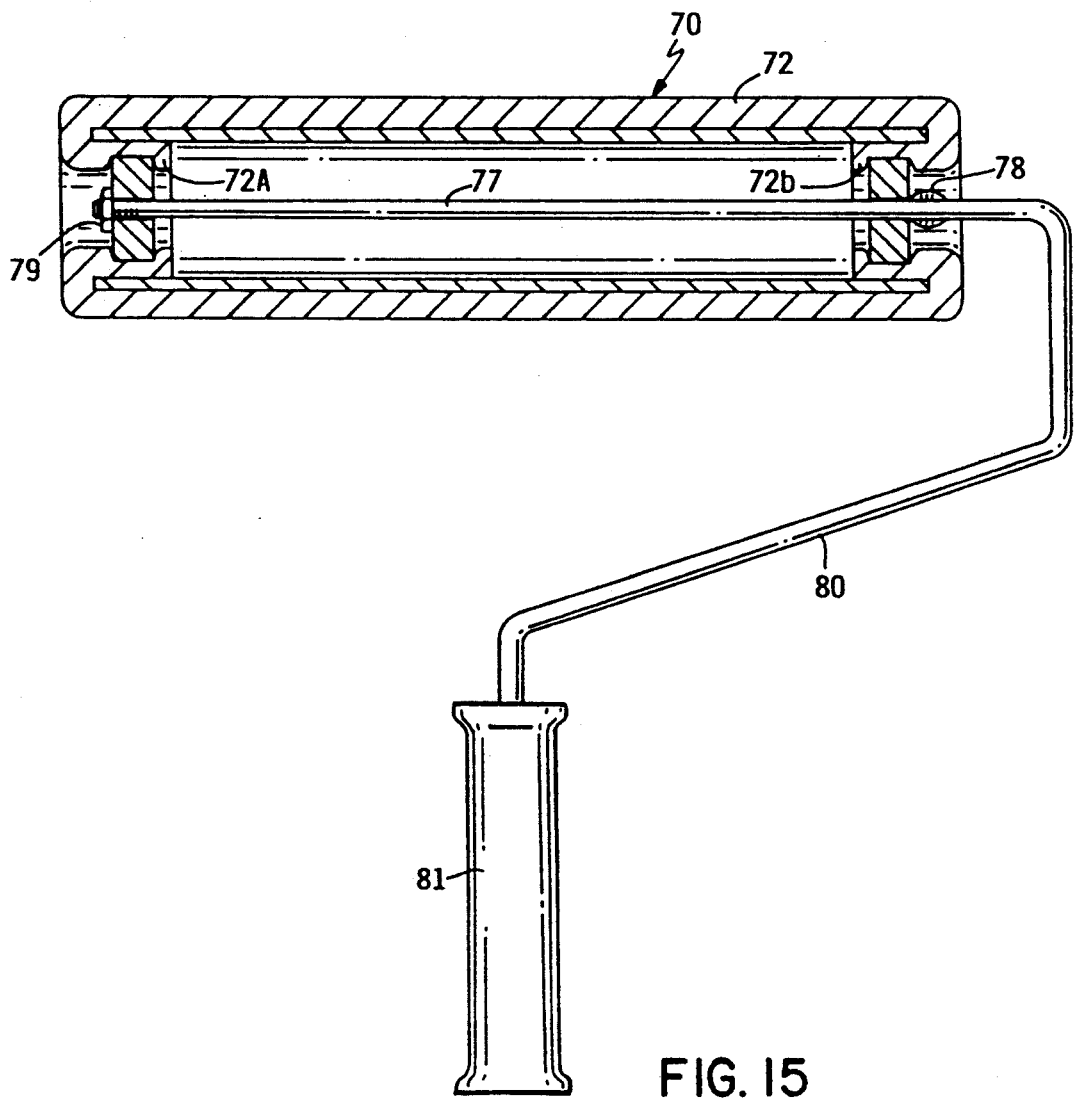
FIG. 15 shows a cylindrical support rod held in the paint roller of FIG. 14 by a nut and flange.

FIGS. 14 and 15 show a further alternate method of making a paint roller and mounting it on a cylindrical shaft 77. Shaft 77 has a flange 78 and a nut 79 for rotatably securing a paint roller 70 therebetween. In the method of FIGS. 14 and 15, end plugs 73 and 75 are located inward of the ends of the tucked-in paint-roller cover 72. An opening 74 and an opening 76 allow for rotatably mounting of shaft 77 therein. The method of embodiment in FIGS. 14 and 15 provide an advantage in that, if the end of the fabric which holds paint becomes worn through use, the roller can be released and the opposite end exposed for use as the corner portion of the roller.

Figure 16:
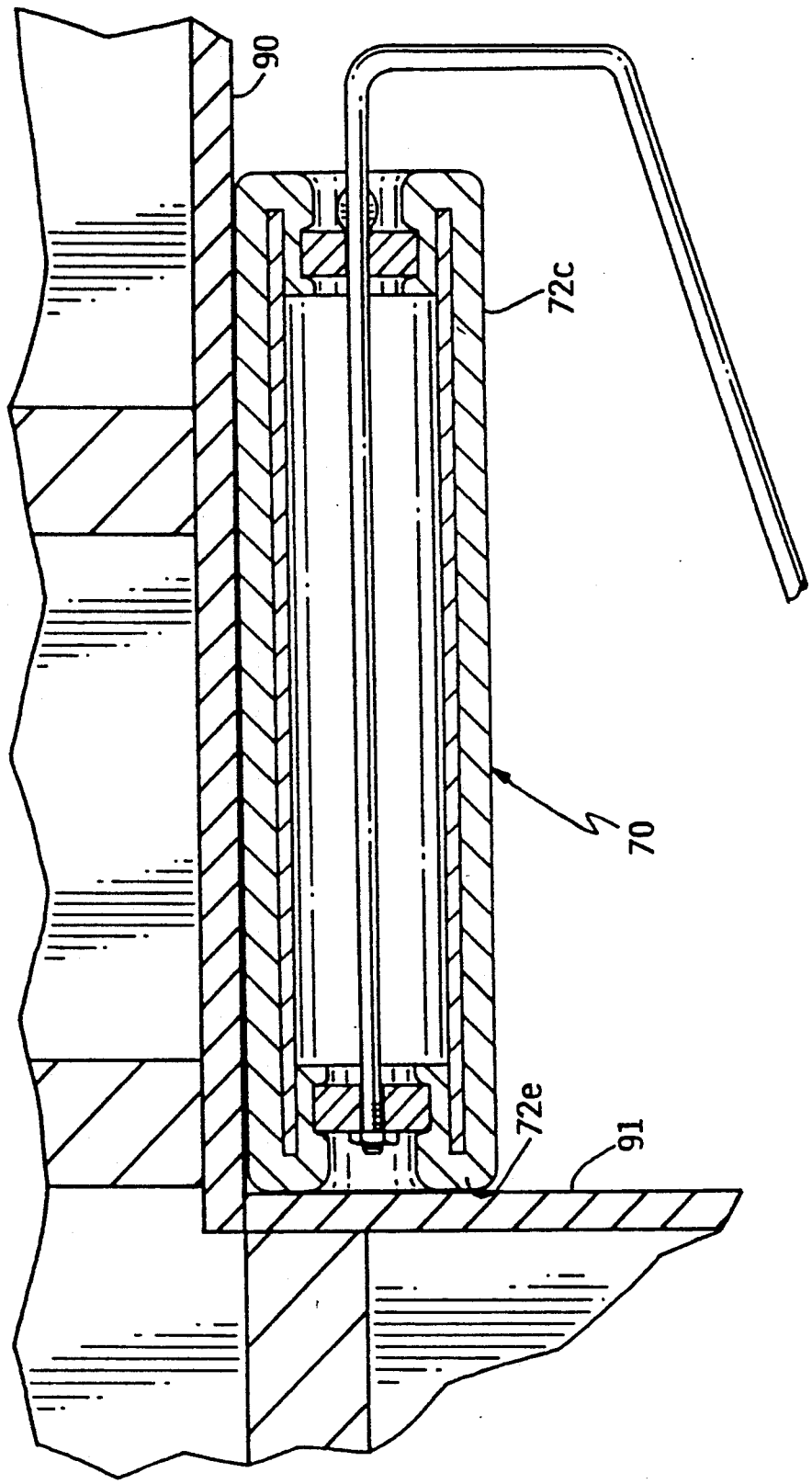
FIG. 16 shows the paint roller of FIG. 15 in use.

FIG. 16 illustrates how paint roller 70 can be used to paint a corner having adjacent wall surfaces 90 and 91; that is, end 72a of paint roller 70 applies paint to surface 91 while cylindrical surface 72c of paint roller 70 applies paint to wall surface 90.

Although this description explains the process with respect to spirally wound fabric covers, it also is suitable for use with non-fabric materials and for non-spirally wound paint-roller covers.

In summary, the process of making multiple paint rollers with foldable ends comprises the steps of: securing a fabric to a master paint-roller support core. In the next step, one cuts the master spiral-wrapped paint roller into multiple segments with the cut ends of the paint-roller pad and core coextensive with each other. Next, one rotates the core while milling away a portion of one or both ends of the support core without removing the paint-roller pad thereby leaving a paint roller with an unsupported free end that is foldable over the end of the paint roller. In further processing, one folds the end and secures it to end plugs. The end plugs may be solid or open to permit attachment of different bearing housings.

We claim:

1. The process of making a paint roller with a foldable end comprising the steps:
   wrapping a paint-roller pad around a master paint-roller support core having a central axis;
   securing the paint-roller pad to the master support core to produce a continuous master paint roller;
   cutting the master paint roller into multiple segments to create paint-roller segments having the cut end of the paint-roller pad and the cut end of the master paint-roller support core coextensive with each other; and
   removing a portion of one end of the paint-roller support core of the cut segment without removing the paint-roller pad on top of said paint-roller support core to leave an unsupported free pad end that is foldable onto the cut end of the support core.

2. The process of claim 1 including the step of tucking the unsupported pad end into the paint-roller support core to secure the pad end thereto.

3. The process of claim 2 wherein the paint-roller pad is spirally wound onto the master core.

4. The process of claim 1 including the step of applying an adhesive to the master paint roller for securing the paint-roller support core to the paint-roller pad.

5. The process of claim 1 wherein the master paint roller is cut at a right angle to the central axis to produce right-angle cylindrical paint-roller segments.

6. The process of claim 1 including the step of removing the opposite end of the support core without removing the paint-roller pad on top of the opposite end of the support core to leave a second unsupported free pad end that is foldable over the opposite end of the support core.

7. The process of claim 6 including the step of inserting a first cylindrical plug having a central opening in said one end of the support core to hold one unsupported free pad end around one end of the support core and inserting a second cylindrical plug having a central opening in the opposite end of the support core to hold the opposite end of the unsupported free pad end around the opposite end of the support core.

8. The process of claim 7 including the step of inserting a support shaft through said first cylindrical and second cylindrical openings and rotatably securing the paint roller to said shaft.

9. The process of claim 1 including the step of making the support core out of a machinable material.

10. The process of claim 9 including the removal step of simultaneously machining away the ends consisting of the support core.

11. The process of claim 1 including the step of placing a plug in said one end of the support core to secure the unsupported free pad end of the paint-roller pad around the end of the support core.

12. The process of claim 11 including the step of securing the unsupported free pad end to the plug with staples.

13. The process of claim 11 including the step of inserting a first end of a squirrel-cage support into the opposite end of the support core until said first end of the squirrel-cage support is proximate the plug and the other end of the squirrel cage support is proximate the opposite end of the support core.

14. The process of claim 11 including the step of securing cylindrical bearing collars to the interior of the support core and then inserting a shaft through said bearings to rotatably support said paint roller on said shaft.

15. The process of claim 1 including the step of spiral wrapping the paint-roller pad at approximately a 45-degree angle to a central axis extending through the paint-roller cover.

16. The process of making a paint roller with a foldable end comprising the steps:
   wrapping a paint-roller pad around a paint-roller support core having a central axis;
   securing the paint-roller pad to the master support core to produce a continuous paint roller with a continuous paint-roller pad with at least one end of the paint-roller pad carried by one end of the paint-roller support core; and removing a portion of one end of the paint-roller support core without removing the paint-roller pad on top of said paint-roller support core to leave an unsupported free pad end that is sufficiently long so as to be foldable onto the end of the support core.

17. The process of claim 10 including the step of heat bonding the paint roller pad to said paint-roller support core.

* * * * *